(12) United States Patent
Lepe

(10) Patent No.: US 8,219,601 B1
(45) Date of Patent: Jul. 10, 2012

(54) METHOD FOR OPERATING A COMPUTER FOR GENERATING A COMPREHENSIVE AND EXCLUSIVE LIST OF PRIME NUMBERS

(76) Inventor: Henry Lepe, Wichita, KS (US)

( * ) Notice: Subject to any disclaimer, the term of this patent is extended or adjusted under 35 U.S.C. 154(b) by 159 days.

(21) Appl. No.: 12/720,797

(22) Filed: Mar. 10, 2010

(51) Int. Cl.
*G06F 7/00* (2006.01)
*G06F 15/00* (2006.01)

(52) U.S. Cl. .......................... 708/200; 380/28
(58) Field of Classification Search .......... 708/490–492, 708/250–256, 200
See application file for complete search history.

(56) References Cited

U.S. PATENT DOCUMENTS

| | | | | |
|---|---|---|---|---|
| 7,346,637 | B2 * | 3/2008 | Agrawal et al. | 708/200 |
| 7,552,164 | B1 * | 6/2009 | Visegrady et al. | 708/492 |
| 7,929,022 | B2 * | 4/2011 | Low | 348/222.1 |
| 8,010,473 | B2 * | 8/2011 | Crandall et al. | 706/45 |
| 2010/0306295 | A1 * | 12/2010 | Daemen et al. | 708/250 |

OTHER PUBLICATIONS

Fernando J. Barros, Dynamic Structure Modeling and Simulation of the Eratosthenes Sieve for Prime Numbers, 1997, IEEE, pp. 184-189.*
Heather A. Wake and Duncan A. Buell, Congruential Sieves on a Reconfigurable Computer, Proceedings of the 11th Annual IEEE Symposium on Field-Programmable Custom Computing Machines (FCCM'03), 2003, pp. 1-8.*
U.S. Appl. No. 11/373,034, Henry Lepe.

* cited by examiner

*Primary Examiner* — Lewis A Bullock, Jr.
*Assistant Examiner* — Kevin G Hughes
(74) *Attorney, Agent, or Firm* — Kenneth H. Jack; Davis & Jack, LLC

(57) ABSTRACT

A method for operating a computer for generating a comprehensive and exclusive list of prime numbers which are less than or equal to a selected large integer M, the method including steps of operating the computer to establish a row head series R, to establish an integer value A, to establish an integer value L, to establish a series of integer rows based on R and A, to cyclicly generate and regenerate the series of integer rows based upon cyclicly redefined values of R and A, and to perform prime and non-prime labeling of members of a very large finally generated series of integer rows in the manner of the method of the Sieve of Eratosthenes.

2 Claims, 2 Drawing Sheets

$$M = 101, \sqrt{101} \approx 10.03$$

$$R = \{5, 7\}$$

$$A = 3 \times 2 = 6$$

$$IR_1 = \{\overset{P}{5}, 11, 17, 23, 29, \overset{NP}{35}\}$$

$$IR_2 = \{7, 13, 19, \overset{NP}{25}, 31\}$$

$$M = 101, \sqrt{101} \approx 10.03$$

$$R = \{5, 7\}$$

$$A = 3 \times 2 = 6$$

$$IR_1 = \{\overset{P}{5}, 11, 17, 23, 29, \overset{NP}{35}\}$$

$$IR_2 = \{7, 13, 19, \overset{NP}{25}, 31\}$$

$$A = 5 \times 3 \times 2 = 30$$

$$L = (7 \times 5 \times 3 \times 2) + 11 = 221$$

$$L > \sqrt{M}$$

Fig. 3

$$IR_1 = \{\overset{P}{7}, 37, 67, 97\}$$

$$IR_2 = \{11, 41, 71\}$$

$$IR_3 = \{13, 43, 73\} \qquad C = \{49, 77, 91\}$$

$$IR_4 = \{17, 47, \overset{NP}{\cancel{77}}\}$$

$$IR_5 = \{19, \overset{NP}{\cancel{49}}, 79\}$$

$$IR_6 = \{23, 53, 83\}$$

$$IR_7 = \{29, 59, 89\}$$

$$IR_8 = \{31, 61, \overset{NP}{\cancel{91}}\}$$

METHOD FOR OPERATING A COMPUTER FOR GENERATING A COMPREHENSIVE AND EXCLUSIVE LIST OF PRIME NUMBERS

FIELD OF THE INVENTION

This invention relates to computer performable methods for generation of prime numbers or for testing of large integers for primeness for use in cyphering, encryption, and de-encryption processes.

BACKGROUND OF THE INVENTION

It is commonly known that computerized encryption and de-encryption programs and processes are dependent upon utilization and availability of large prime numbers. Accordingly, computer actuated methods and processes which determine and display large prime numbers desirably assist in message encryption and de-encryption. Such large prime numbers may appropriately be viewed as "raw material" which is processed in the message encryption and de-encryption arts.

Commonly known methods and processes for generating large prime numbers undesirably require a large amount of computer capacity and computer processing time.

The instant inventive prime number generating method solves or ameliorates problems discussed above by providing a method for determining large prime numbers, which method utilizes a relatively small amount of computer power and computing processing time.

BRIEF SUMMARY OF THE INVENTION

The Sieve of Eratosthenes prescribes a method for determining prime numbers. Such sieve method is either operable upon the following series of positive integers:

{2, 3, 4, 5, . . . , n}, or is operable upon the series of odd integers, beginning with 3.

In computer actuated utilization of the Sieve of Eratosthenes, "n" typically represents an extraordinarily large positive integer which is known to be larger than the largest prime number which is sought to be determined. According to the method of the Sieve of Eratosthenes, each integer member of the above series is initially unlabeled. In the first step of the method, the least unlabeled member of the series (i.e., 2) is labeled by the computer as "prime" and each whole multiple of such prime thereafter within the series is labeled as "non-prime". The steps of labeling the least unlabeled member as "prime" and labeling subsequent multiples of that least member as "non-prime" may be terminated when the least unlabeled member of the series is greater than $\lfloor\sqrt{n}\rfloor$ (i.e., the lower delimited whole number portion of $\sqrt{n}$). At that point, each remaining unlabeled member of the series may be accurately labeled by the computer as "prime". All prime numbers less than or equal to "n" are accurately generated by a computer executing the method of the Sieve of Eratosthenes. An advantage of the Sieve of Eratosthenes is that its method identifies the prime or non-prime character each number member of the series solely by virtue of member's position within the series, and without any analysis or calculation steps directed to the number member itself.

A problem or disadvantage of the method of the Sieve of Eratosthenes is that the numeric series upon which the method operates often is inordinately large, taking an inordinate amount of computer processing time to completely perform the method. Where the instant inventive prime number generating method is applied by a computer to determine all prime numbers less than or equal to the same large positive integer "n", the numeric series to which the inventive method applies is markedly smaller than the number series utilized by the Sieve of Eratosthenes.

The instant inventive method operates similarly with that of the Sieve of Eratosthenes in that the prime or non-prime character of each number member is determined by virtue of the number's position within an integer series without any analysis or calculations directed to the numbers themselves.

By eliminating a large portion of the number member's dealt with in the Sieve of Eratosthenes method, the instant inventive method beneficially and advantageously saves computer processing time in the determination of prime numbers for use in cyphering, encryption, and de-encryption methods and processes. The inventive method allows high powered computers to determine a higher prime number output.

Accordingly, an object of the instant invention is to provide a method for determining prime numbers which saves computer processing time through the method's ability to utilize and operate upon a relatively small numeric series.

Other and further objects, benefits, and advantages will become known to those skilled in the art upon review of the Detailed Description which follows, and upon review of the appended drawings and the accompanying exemplary computer program.

BRIEF DESCRIPTION OF THE DRAWINGS

FIG. 1 represents the instant method's computer actuated generation of an initial series of integer rows.

FIG. 2 represents one of the instant method's computer actuated cyclical setting and re-settings of series row heads, and additive factor, and a limiting factor.

FIG. 3 represents a final computer actuated generation of the series of integer rows, and represents labeling and elimination steps performed by the computer upon such series.

DETAILED DESCRIPTION OF A PREFERRED EMBODIMENT

The input data which is preferably utilized by a computer which performs the instant inventive method is the first four prime numbers 2, 3, 5, and 7, and a selected large integer M. The large integer M represents a number to be tested for primeness and/or represents a magnitude of a largest prime number in a comprehensive and exclusive series of prime numbers to be generated and confirmed by a computer executing the method. In Drawing FIG. 1, M is selected as 101, such number being several orders of magnitude smaller than a large number upon which the computer of the instant method would typically operate.

From said initial data, a series of row heads R={$RH_1$, $RH_2$, $RH_3$, . . . , $RH_i$} is initially established, along with integer values A and L. $RH_1$ is initially set as the third prime number, 5, and $RH_2$ is initially set as the next prime number, 7. Since 7 is the largest prime among the initial list of primes, $RH_i$, or the largest initial row head, is the same as $RH_2$, or 7.

The value of A is defined as the product of all prime numbers which are smaller than $RH_1$. Thus, A initially equals 3×2, or 6. The value of L is defined as (A×$RH_1$)+$RH_2$. Thus, L initially equals 30+7, or 37.

Upon establishing the initial members of R, A, and L, a series of integer rows {$IR_1$, $IR_2$, $IR_3$, . . . $IR_i$}, is established, the first member of each of such rows corresponding with the members of R which is initially {5, 7} as shown above.

Each of the integer rows, $IR_1$, $IR_2$, $IR_3$, ... $IR_j$, preferably constitutes a series of numbers based upon the value of A and the row's row head RH, such series being in the form {RH, RH+A, RH+2A, RH+3A, RH+4A, ..., RH+nA}. In each such integer row, n is selected such that (RH+nA)<L and (RH+(n+1)A)≧L. Accordingly and initially, $IR_1$={$RH_1$, $RH_1$, +A, $RH_1$+2A, $RH_1$+3A, $RH_1$+4A, ..., $RH_1$+nA}, $IR_2$={$RH_2$, $RH_2$, +A, $RH_2$+2A, $RH_2$+3A, $RH_2$+4A, ..., $RH_2$+nA}, $IR_3$={$RH_3$, $RH_3$, +A, $RH_3$+2A, $RH_3$+3A, $RH_3$+4A, ..., $RH_3$+nA}, $IR_j$={$RH_j$, $RH_j$, +A, $RH_j$+2A, $RH_j$+3A, $RH_j$+4A, ..., $RH_j$+nA}.

Referring to FIG. 1, utilizing the initially set values A=6 and L=37, $IR_1$={$RH_1$ or 5, ($RH_1$+A) or (5+6) or 11, ($RH_1$+2A) or (5+12) or 17, ($RH_1$+3A) or (5+18) or 23, ($RH_1$+4A) or (5+24) or 29, ($RH_1$+5A) or (5+30) or 35}, and $IR_2$ (also $R_j$)={$RH_2$ or 7, ($RH_2$+A) or (7+6) or 13, ($RH_2$+2A) or (7+12) or 19, ($RH_2$+3A) or (7+18) or 25, ($RH_2$+4A) or (7+24) or 31}. Stated otherwise, the series of integer rows={$IR_1$, $IR_2$}, where $IR_1$={5, 11, 17, 23, 29, 35}, and $IR_2$={7, 13, 19, 25, 31}.

Following the establishment of the initial series of integer rows as set forth above and as shown in FIG. 1, the instant inventive method preferably further includes computer actuated steps of labeling certain members of those rows. As an initial labeling step, the smallest member of the series of integer rows (i.e., initially 5) is labeled as prime or P as shown in FIG. 1. Thereafter, a count starting point set C is preferably established, the members of C preferably being equal to products of P and the row heads of the row series, the largest member of C being less than L. Since the row heads of the initial series of integer rows are 5 and 7, and since the smallest member equals 5, the initial members of C are 25 and 35. Thus, C={25, 35} as shown in FIG. 1.

Following the establishment of the count starting point set C, non-prime labeling of other members of the series of integer rows is performed in the manner of the place counting method of the Sieve of Eratosthenes described above. According to that method, the computer is operated so that for each member of C (such individual members being denoted in the form ($RH_m$×P)), a matching or equivalent member of the series of integer rows is identified. Thereafter, that matching member is labeled as non-prime, and every Pth member thereafter within that member's row is similarly labeled non-prime. Such non-prime labeling is represented by the "NP" notations in FIG. 1.

After completion of the prime and non-prime labeling steps described above, each member of the series of integer rows which has been labeled (e.g., referring to FIG. 1, the member labeled P and two other members labeled NP) is eliminated. The computer's performance of such elimination step is represented by the dotted lines appearing in FIG. 1. Thereafter, the initial R row head series is replaced with a new series of row heads R, such new R series corresponding identically with said remaining non-eliminated members of the series of integer rows. Thereafter, according to a preferred computer actuated performance of the method of the instant invention, A and L are re-set based upon the newly established smallest and next smallest members of R. Such next steps are represented in FIG. 2.

Thereafter, a new series of integer rows is established in the manner described above based upon the new values of R and the re-set A and L values. FIG. 3 represents such establishment of new integer rows. Following such re-establishment of the series of integer rows, the count starting point set C is re-established and prime and non-prime labeling followed by eliminations from the new series of integer rows is performed by the computer in the manner described above.

The above described steps of establishing and re-establishing values of A, L, the row heads R, a series of integer rows, and C is preferably performed repetitively or cyclically, producing series of integer rows which are progressively increasing in size. The instant inventive method requires that a computer perform at least one cyclic re-establishment of the series of integer rows. At a maximum, the row series are cyclically re-established in the manner described above until the largest member of the series is greater than or equal to M. Yet, in a preferred computer actuated performance of the instant inventive method, the cyclical re-establishment of integer row series is terminated at the step at which L is re-set to equal a value which exceeds $\sqrt{M}$. Selection of such limitation minimizes computer processing time utilized in performing the method of the instant invention.

Assuming that the above described cyclic repetition of steps is terminated prior to the point at which L reaches the value of M, a next to largest rendition of the integer row series is thereby generated and a final series of row heads R is thereby produced. Thereafter, such finally generated R is utilized by the computer to generate a final and largest integer row series. The steps performed in generating such final integer row series are preferably identical to the prior cyclical generations of integer row series with the exception that in the final generation, the value M is utilized in place of L. Referring to FIG. 3, the depicted IR series represent such final integer row series since, as preferred, the value of L exceeds the square root of M.

Thereafter, the prime and non-prime labeling steps applicable to the initial integer row series as described above are repeatedly and successively applied to the final integer row series with the exception that in each labeling cycle applied to such final series the smallest unlabeled member of the series (i.e., the least number member which is neither labeled P or NP) constitutes the newly labeled prime number to be utilized for re-generating the count starting point set C. In such re-generations of the count starting point set, the largest value of C is preferably less than or equal to M.

The above described cyclical labeling of members of the final integer row series preferably continues until, upon a final cycle, the smallest unlabeled member of the series is greater than or equal to $\sqrt{M}$. At that cyclical point, the computer is preferably further operated to label every remaining unlabeled member of the series as prime or P.

Thereafter, all numbers labeled in the computer performance of the inventive method as prime are preferably placed by the computer in an ordered series as the output of the method. Such series output advantageously constitutes the computer's generation of a comprehensive and exclusive list of prime numbers.

All of the steps of the method are necessarily performed via digital computer. The following computer programming language exemplifies a means for utilizing such computer to perform the method of the invention.

```
beginpgm
1→p(0), 2→p(1), p(0)→A(0), A(0)*p(1)→B(0), 0→m, 0→n, 2→{HRS}, {HRS}→{DHRS}
{TRASH}=Ø, {PRIMES}={2}, 1→i, {ROW(i)}=Ø, {DROW(i)}=Ø, 0→r(i)
Begin comment:
These sets are arithmetically ordered. The following procedures find heads of rows for level
```

```
n+1 from level n.
End comment:
Procedure Preheads(n+1):
    While{DHRS}≠ Ø do
        MIN({DHRS})→r(i)
        If n<2 then
            (r(i)+1*A(n))→p(n+2)
            {DHRS}=Ø
        Else
            If i=1 then
                {DHRS}−{r(i)}→{DHRS}
                i+1→i
                MIN({DHRS})→r(i)
                    r(i)→p(n+2)
            endif
if {DHRS}≠ Ø Then do
{DHRS}−{r(i)}→{DHRS}
Endif
If i=2 then
0→m
While (r(1)+m*A(n)) < (B(n) + p(n+2)) do
{(r(1) + m* A(n))} U{ROW(1)}→{ROW(1)}
m+1→m
endwhile
endif
endif
0→m
While (r(i)+m*A(n))<B(n)+p(n+2)) do
    {(r(i)+m*A(n)}U{ROW(i)}→{ROW(i)}
    m+1→m
Endwhile
0→m , i+1→i
Endwhile
End Procedure:
1→total
1→j
Procedure Headsfor(n+1):
    While j≦total do
        {ROW(j)}={DROW(j)}
{ROW(j)} = Ø
    j+1→j
endwhile
1→j, 0→m
While j≦total do
    While {DROW(j)}≠ Ø do
        If Remainder((r(j)+m*A(n)),r(1))=0 then
            {DROW(j)}−{r(j)+m*A(n)}→{DROW(j)}
            m+1→m
else
{(r(j) + m*A(n))} U {ROW(j)}={ROW(j)}
{DROW(j)}−{r(j) + m* A(n))}→{DROW(j)}
m+1→m
endif
endwhile
j+1→j
endwhile
End procedure;
0→n
While n<60 do
    If n=0 then
    else
    U$_{i=1}^{total}$ {ROW(i)}={HRS}
    endif
|{HRS}|→total
{HRS}→{DHRS}
1→i
Call Preheads(n+1)
1→j
Call Headsfor(n+1)
B(n)→A(n+1)
n+1→n
A(n)*p(n+1)→B(n)
Endwhile
U$_{i=1}^{total}${ROW(i)}={HRS}
|{HRS}|→total
False→Specific
Begin Comment
If you want to save memory space and only seek the status of a single number skip to
branch 2, by setting true→ specific
End comment
```

```
If specific then
Goto (branch2)
End if
1→i, 0→m, 60→n, B(59)→A(60)
{Heads(1)}=Ǿ, {Heads(3)}=Ǿ, {Heads(7)}=Ǿ, {Heads(9)}=Ǿ
10^Billion→Max1, ⌊√Max1⌋→SQ1
While i≤ total do
    MIN({HRS})→d(i)
        {d(i)}U{Heads(Remainder(d(i),10))}={Heads{Remainder(d(i),10))}
        {HRS}-{d(i)}={HRS}
        i+1→i
Endwhile
|{Heads(1)}|→Tot(1), |{Heads(3)}|→Tot(3), |{Heads(7)}|→Tot(7), |{Heads(9)}|→Tot(9)
Procedure Renumber(t):
1→i
While i ≤ Tot(t) do
    MIN({Heads(t)})→r(t,i)
    {Heads(t)}-{r(t,i)}→{Heads(t)}
    i+1→i
    Endwhile
End Procedure
Call Renumber(1)
Call Renumber(3)
Call Renumber(7)
Call Renumber(9)
Procedure Kro(t):
    1→i,0→m
    While i ≤ Tot(t) do
    {ROW(t,i)}=Ǿ
        While m ≤ IntDiv((Max1−r(t,i),A(60)) do
            {(r(t,i) + m*A(60))}U{ROW(t,i)}={ROW(t,i)}
            m+1→m
        Endwhile
        i+1→i,0→m
    Endwhile
Endprocedure
Call Kro(1)
Call Kro(3)
Call Kro(7)
Call Kro(9)
1→i, 1→j, 1→t, 1→s, 0→m2
Procedure RemoveMultiples(t,s):
Begin Comment:
Tot(t) = | {Heads(t)} | = the number of the rows that end in t=1,3,7,or 9.
i corresponds to the number r(t,i) we are to find multiples of. j corresponds to the r(s,j) of heads of
rows that we multiply by to find the least multiple in some row. m2 = 0 is the 1^st column, m2 = 1 is
the 2^nd column, etc.
End Comment:
1→i, 0→m2, 1→j
    While i ≤ Tot(t) do
        While j ≤ Tot(s) do
            While m2 ≤ IntDiv(((SQ1−r(t,i)),(r(t,i)*A(60))) do
                {(r(t,i) + r(t,i)*m2*A(60))*r(s,j)}U{TRASH}={TRASH}
                m2+1→m2
            Endwhile
            j+1→j, 0 → m2
        Endwhile
i+1→i, 1→j, 0→m2
Endwhile
Endprocedure
Call RemoveMultiples(1,1)
Call RemoveMultiples(1,3)
Call RemoveMultiples(1,7)
Call RemoveMultiples(1,9)
Call RemoveMultiples(3,1)
Call RemoveMultiples(3,3)
Call RemoveMultiples(3,7)
Call RemoveMultiples(3,9)
Call RemoveMultiples(7,1)
Call RemoveMultiples(7,3)
Call RemoveMultiples(7,7)
Call RemoveMultiples(7,9)
Call RemoveMultiples(9,1)
Call RemoveMultiples(9,3)
Call RemoveMultiples(9,7)
Call RemoveMultiples(9,9)
Procedure FindPrimes(t):
    0→i
    While i ≤ Tot(t) do
        0→m
```

```
    While m ≤ Max1 do
        If {(r(t,i) + m*A(60))}∩{TRASH} =∅ Then
            {(r(t,i) + m*A(60))}U{PRIMES}={PRIMES}
            m + 1→m
        Endif
        m+1→m
    Endwhile
    i + 1 → i, 0→m
Endwhile
Endprocedure
Call FindPrimes(1)
Call FindPrimes(3)
Call FindPrimes(7)
    Call FindPrimes(9)
Goto (finale)
(branch2)
60→lvl
Begin comment
Suppose we stop after finding the heads of rows for level(lvl). Then we have:
Level(lvl) = ∪_{i=1}^{total} {r(i) + m*A(lvl) | m ≧ 0}. A(lvl) = Π_{j=0}^{lvl} p(j), where p(j) is the jth prime
number.
p(0)≡1. We ask the question: Is N a number?
End comment
1→ i
While IntDiv ((N−r(i)), A(lvl)) ≠ 0 do
    If i> total then
PRINT N, 'is not a number'
Goto ( finale )
Endif
i+1→i
Endwhile
i−1→ i
PRINT N, 'is in row', r(i)
r(i)→KK1
Begin comment
KK1 is a number but is it a prime number?
End comment
√(N+1)→SqN
1→ i
1→ j
0→ m
While ( r(i)+ m* A(lvl))≦ SqN do
1000→kolm
While m≦ kolm do
While i≦ total do
While j≦ total do
If IntDiv((((r(i)+m* A(lvl))* r(j)−KK1),A(lvl)) =0 then
PRINT '{((r(i)+ m*A(lvl))* r(j))+((r(i)+m*A(lvl))*M*A(lvl)) | M≧0} in nonprime in row', KK1
If ((r(i)+m*A(lvl))*r(j))>SqN then
50*total→j
Endif
j+1→j
EndWhile
If ((r(i) + m* A(lvl))*r(j))>SqN then
5*total→ i
Endif
1→j
i+1→i
Endwhile
If ((r(i) +m*A(lvl))*r(j))>SqN then
5*kolm→m
endif
1→j
1→i
m+1→m
endwhile
j−1→j
i−1→i
m−1→m
Begin comment
The printouts are ALL the nonprimes≦(N+1) in row KK1. If no nonprime coincides with N,then N
is a prime number.
Explanation:
If N is in row(k), then (N−row(k))/A(lvl) = itr. Itr +1 is the number of places from the
Beginning of the row. If there is no nonprime at that exact location, N is a prime number.
End comment
(finale)
Endpgm
```

While the principles of the invention have been made clear in the above illustrative embodiment, those skilled in the art may make modifications in the method steps of the invention without departing from those principles. Accordingly, it is intended that the description and drawings be interpreted as illustrative and not in the limiting sense, and that the invention be given a scope commensurate with the appended claims.

I claim:

1. A method for operating a computer to encrypt and decrypt a message utilizing prime numbers which are less than or equal to a selected large integer M in a computerized encryption or decryption program, the method comprising steps of:
  (a) operating the computer to establish a series R, R comprising row head integers, the smallest member of R initially being 5, the next smallest member of R initially being 7, and the largest member of R also initially being 7;
  (b) further operating the computer to establish an integer value A which is equal to the product of all prime numbers which are less than the smallest member of R;
  (c) further operating the computer to establish an integer value L which is equal to a sum of addends, said addends comprising the multiplicative product of A and the smallest member of R, and said addends comprising the next smallest member of R;
  (d) further operating the computer to establish a series of integer rows, the first member of each integer row being one of the members of R, each remaining member of said each integer row being a sum of said one of the members of R and a whole multiple of A, the largest member of said each integer row being the largest such sum which is less than or equal to L;
  (e) further operating the computer to label the smallest unlabeled member of the series of integer rows as prime P;
  (f) further operating the computer to establish a set of numbers C, each member of C being a product of said prime P labeled member and one of the members of R, the largest member of C being less than or equal to L;
  (g) for each member of C further operating the computer to identify an integer member of the series of integer rows, said integer member having a number value which is equivalent to that of said each member of C, to label that equivalent member as non-prime, and to label every Pth member thereafter within that equivalent member's row as non-prime;
  (h) further operating the computer to eliminate from the series of integer rows each labeled member;
  (i) further operating the computer to reset R equal to the remaining members of the series of integer rows;
  (j) further operating the computer to reset A equal to the product of all prime numbers which are less than the smallest member of R;
  (k) further operating the computer to reset L equal to a reset sum of addends, said addends comprising the multiplicative product of A and the smallest member of R, and said addends comprising the next smallest member of R;
  (l) further operating the computer to repeat the A establishing, L establishing, series of integer rows establishing, prime labeling, C establishing, non-prime labeling, series member eliminating, and R re-setting steps, said repetition of steps continuing while L is less than the square root of M;
  (m) further operating the computer to establish a final series of integer rows, the first member of each integer row of the final series of integer rows being one of the members of R, each remaining member of said each integer row being a sum of said one of the members of R and a whole multiple of A, the largest member of said each integer row being the largest such sum which is less than or equal to M;
  (n) further operating the computer to set L equal to M and to repeat the prime labeling, C establishing, and non-prime labeling steps, the last repetition having no unlabeled member of the series of integer rows which is less than the square root of M;
  (o) further operating the computer to label every unlabeled member of the series of integer rows as prime and to eliminate every member labeled as non-prime, wherein the remaining members of the series are the generated comprehensive and exclusive list of prime numbers less than or equal to M; and
  (p) utilizing at least a first member among said remaining members of the series to encrypt and decrypt the message in the computerized encryption or decryption program.

2. The method of claim 1 wherein the computer is further operated to arrange in series every integer labeled as prime.

* * * * *